INVENTOR
LAWRENCE A. MARTINO
BY
*Burns, Doane, Benedict, Swecker & Mathis*
ATTORNEYS Sept. 27, 1966  L. A. MARTINO  3,275,728
PARISON SEVERING METHOD
Filed Dec. 4, 1962  2 Sheets-Sheet 2
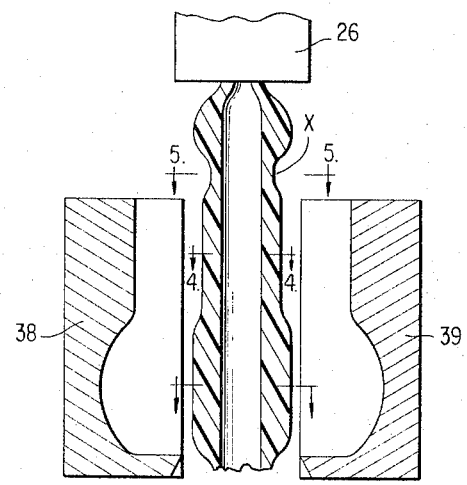
FIG.2
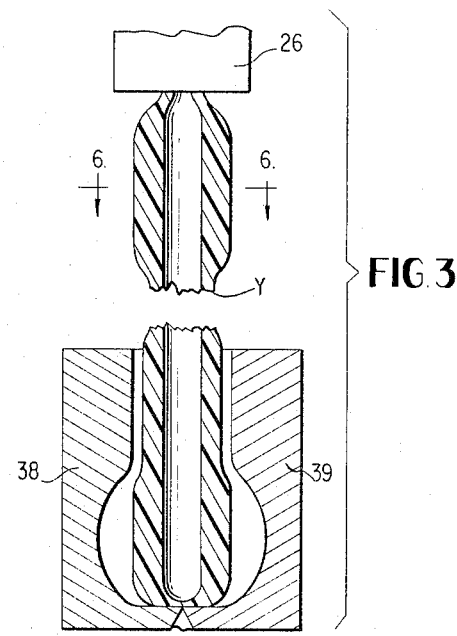
FIG.3
FIG.4  FIG.5  FIG.6
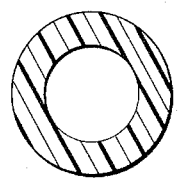 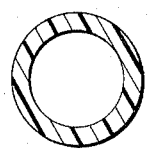 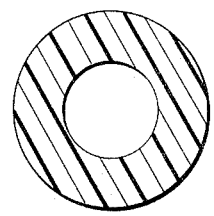
INVENTOR.
LAWRENCE A. MARTINO
BY
Burns, Doane, Benedict, Swecker and Mathis
ATTORNEYS

United States Patent Office 3,275,728
Patented Sept. 27, 1966

3,275,728
PARISON SEVERING METHOD
Lawrence A. Martino, New Britain, Conn., assignor to Monsanto Company, St. Louis, Mo., a corporation of Delaware
Filed Dec. 4, 1962, Ser. No. 242,126
7 Claims. (Cl. 264—150)

This invention pertains to a parison severing technique. In particular, it relates to a method for effecting uniform tearing of a preselected and localized annular portion of an extruded formation of plastic material.

A particularly vexing problem in the art of molding articles from extruded parisons has involved the severing of the parison from the extrusion stream. Heretofore, this severing operation has usually required blades, knives, or other cutting devices. Such mechanisms require precise operational timing and thus introduce structural and functional complexities into the molding operation. In addition, knives and blades are prone to become clogged with plastic material so as to impede the severing operation.

Under some circumstances parisons have been extruded downwardly into position between inverted mold halves. When such halves are closed about the extruded parison, the article bottom defining portions of the mold engage, pinch and close the parison. With this particular arrangement, parison severing has been accomplished by moving the mold laterally in relation to the extrusion orifice such that severing takes place at the mold pinching zone. As is readily apparent, where upright molds are employed, i.e. molds having article bottom defining and parison pinching portions disposed at the lower end of the mold halves, this severing technique is not feasible. Were it attempted to be thus utilized, parison tearing or severing would likely result in the base of the mold so as to cause the mold to be pulled free of the parison before the molding operation took place.

It has been contemplated that parison severing might be accomplished by the mere exertion of an axial force on an extruded parison portion. Particularly where large diametered parisons were involved, this technique has proven unsatisfactory due to its failure to produce even tearing and its tendency to cause fouling of the extruding parison stream.

In recognition of the need for an improved parison severing technique, it is an object of this invention to provide a method for effecting the controlled and uniform tearing of parisons.

It is a particular object of the invention to present a technique for selectively thinning a limited parison portion so that a prior extruded parison section may be separated from a plastic formation without resorting to conventional cutting techniques.

A further object of the invention is to provide a parison tearing technique by means of which a parison portion may be torn from an extruding plastic formation without causing the formation to snap back toward the extrusion orifice and become fouled with the extrusion apparatus.

An additional object of the invention is to provide a parison tearing technique which includes an additional step of restoring a parison thinning mechanism after parison thinning has taken place so as to effect a desired thickening at the lower end of a subsequently extruded parison portion.

In accomplishing the objects of this invention, a selected annular portion of a tubular formation of plastic material is thinned at a predetermined location where parison separation is desired. Thereafter, a force is exerted on the formation so as to tear the portion extruded prior to the thinning from the portion extruded subsequent thereto.

In order to obtain a thinning of a selected parison portion, the pressure at which plastic material is extruded through an extrusion outlet may be selectively reduced so as to cause a reduction in wall thickness of a selected portion of an extruding formation whereby a prior extruded portion of the formation may be disengaged by tearing.

In a continuous extrusion process, a selective thinning of a parison portion may be accomplished by selectively enlarging the capacity of a cavity connecting a source of plastic material with an extrusion outlet. Preferably this cavity enlargement is accomplished adjacent the extrusion outlet. By rapidly effecting the cavity enlargement, the degree of parison thinning will be sufficient to enable a prior extruded parison portion to be separated by a mere axial pull. Where a plunger is withdrawn from a cavity to effect the cavity enlargement, it may be reinserted into the cavity to produce a subsequent parison thickening in order to strengthen the base portion of an article to be formed by a subsequently extruded parison portion.

In describing the invention, reference will be made to a preferred embodiment of an extrusion apparatus which is particularly adapted to accomplish the controlled thinning of limited parison portions for tearing purposes. This apparatus as well as the over-all tearing technique is illustrated in the accompanying drawings, in which:

FIGURE 2 is a partially sectioned, schematic showing of a parison being extruded from the FIGURE 1 apparatus into position between open mold halves;

FIGURE 3 is a partially sectioned, schematic showing of the manner in which the mold halves shown in FIGURE 2 may be closed so as to engage the lower end of an extruded parison and cause the parison to be torn at a preselected, thinned parison zone;

FIGURE 4 is a cross-sectional parison view taken along the section line 4—4 of FIGURE 2;

FIGURE 5 is a cross-sectional parison view taken along the section line 5—5 of FIGURE 2; and FIGURE 6 is a cross-sectional parison view taken along the section line 6—6 of FIGURE 2 and FIGURE 3.

Figure 1:
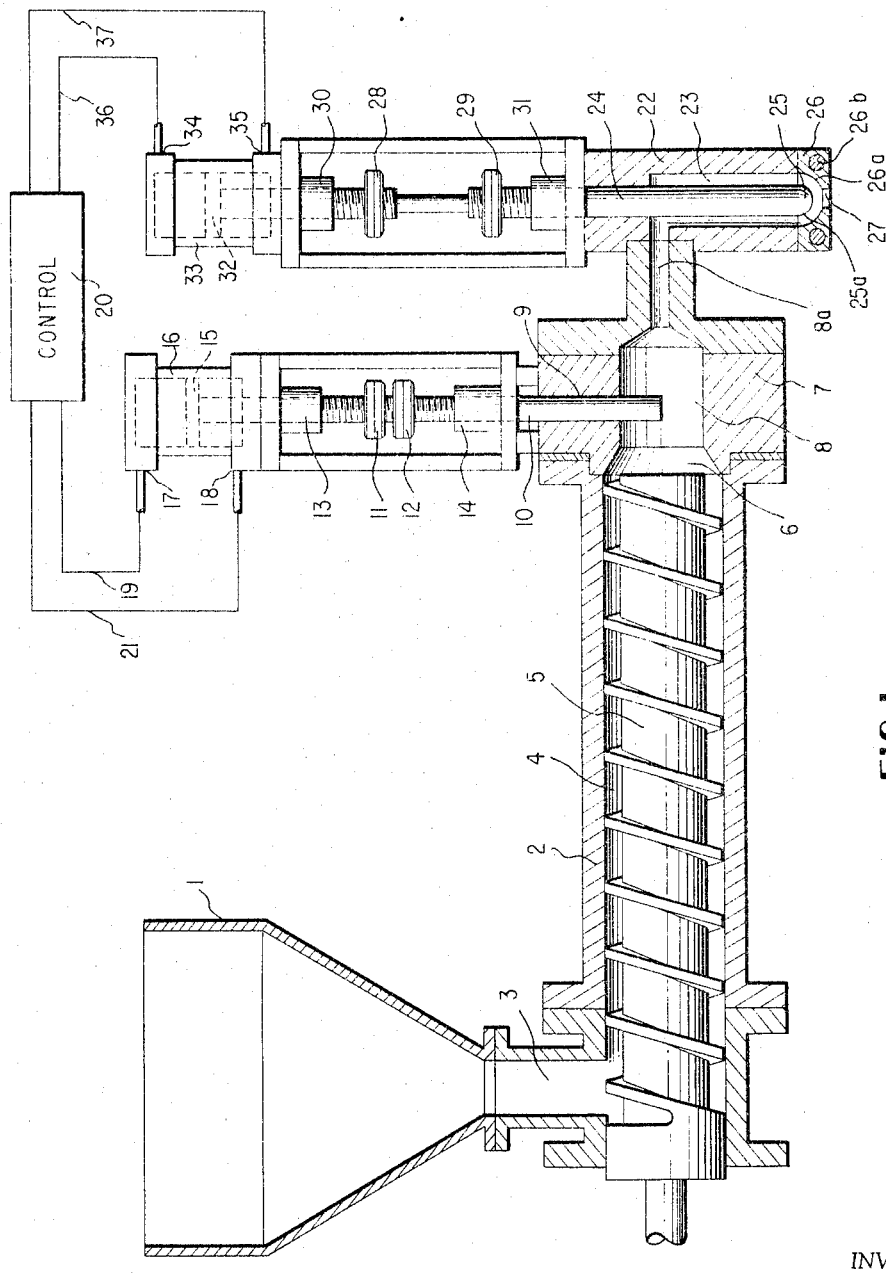
FIGURE 1 is a sectioned, elevational drawing of a preferred extrusion apparatus which is uniquely suited to accomplishing controlled parison thinning.

The extrusion apparatus illustrated in FIGURE 1 includes a conventional hopper 1 for supplying bulk plastic material to a schematically illustrated, conventional plasticizing and feeding unit 2. Plasticizing unit 2 includes a plastic material inlet 3, an elongate passage 4, a plastic material advancing and pressuring worm screw 5, and an outlet 6. Unit 2 would be surrounded with conventional heating units, not illustrated, to effect the plasticizing of material being advanced through passage 4 by screw 5.

Adjacent outlet 6 of plasticizer unit 2 there is mounted an extrusion pressure modifier 7. Pressure modifier 7 includes a passage 8 defining an extension of plasticizer passage 4. Pressure modifier passage 8 is laterally extended by a transverse passage 9. A plunger 10 is mounted for reciprocating movement in passage 9. Plunger 10 is so mounted as to be reciprocable into and out of the pressure modifier passage 8. Stop members 11 and 12 are threadably secured on plunger 10 to provide adjustable means for limiting the reciprocating movement of plunger 10. The upper limit of the reciprocating movement of plunger 10 is determined by engagement of stop 11 with a stationary abutment 13. Downward reciprocating movement of plunger 10 is limited by engagement of stop 12 with a stationary abutment 14. As illustrated in FIGURE 1, abutments 13 and 14 are tubular so as to allow sliding movement of the plunger 10 therethrough.

The upper end of plunger 10 may be affixed to a piston 15 housed within a cylinder 16. A fluid port 17 is provided at the upper end of cylinder 15 while another fluid port 18 is provided at the lower end of the cylinder. A conduit 19 extends from upper port 17 to a control unit 20. A conduit 21 extends from lower port 18 to control unit 20.

Passage 8 of pressure modifier 7 terminates in an outlet 8(a) which communicates with the interior of a parison-forming unit 22. Parison forming unit 22 includes a generally vertically extending bore 23 communicating with an outlet 8(a). A mandrel 24 is reciprocably mounted within bore 23 so as to define an annular passage. At the lower end of the illustrated mandrel 24 there is mounted an extrusion tip 25 which provides an inner surface of a parison defining outlet. An extrusion ring 26 is spaced from the tip 25 to define the outer surface of this extrusion outlet.

Tip member 25 has a downwardly facing, generally convex surface 25(a). Ring member 26 includes an upwardly facing, generally concave surface 26(a). An opening 27 which is of lesser diameter than tip 25, extends from concave portion 26(a) in axial alignment with the tip. Plastic material extruded through the apparatus and passing through the extrusion outlet defined by the tip 25 and the ring 26 will issue from the opening 27 in the form of a hollow parison in the conventional manner recognized in the art.

Reciprocating movement of mandrel 24 and its associated tip 25 is limited by stops 28 and 29 which are threadably and thus adjustably mounted upon mandrel 24. Upward movement of the mandrel 24 and tip 25 is limited by engagement of the stop 28 with a stationary, upper abutment 30. Downward reciprocating movement of mandrel 24 and tip 25 is limited by engagement of lower stop 29 with a stationary, lower abutment 31. Abutments 31 and 30 are hollow to allow sliding movement of mandrel 24 therethrough.

Reciprocating movement of the mandrel 24 and tip 25 may be effected by a piston 32 secured to the upper end of mandrel 24 and mounted within a cylinder 33. Cylinder 33 includes a fluid port 34 at its upper end and a fluid port 35 at its lower end. Fluid port 34 is connected to control mechanism 20 through conduit 36 while port 35 is connected to this control mechanism through conduit 37.

Control unit 20 may be any conventional control mechanism, either mechanical, electrical, pneumatic or hydraulic in nature, designed to selectively control the application of fluid pressure to ports 17, 18, 34 and 35. When fluid pressure is applied to port 17 in cylinder 16, port 18 will function as an exhaust port, with the converse being true when fluid pressure is applied to port 18. Similarly, in cylinder 33, when fluid pressure is applied to port 34, fluid is exhausted from the port 35, while fluid is exhausted from the port 34 when fluid pressure is applied to the port 35. The sequence of application of fluid pressure to the ports 17, 18, 34 or 35 may be selectively controlled by a conventional timing mechanism incorporated in control 20.

Reviewing the apparatus in over-all perspective, it will be appreciated that at the left end of illustrated screw 5 there is provided a source of plastic material. At the opposite end of the apparatus an extrusion outlet is defined by cooperating ring 26 and tip 25. Plasticizer passage 4, pressure modifier passage 8 including lateral passage 9, connecting passage 8(a), and the annular passage encircling mandrel 24 afford a continuously open feed cavity for maintaining communication between the plastic material being fed and the extrusion outlet 27.

The worm screw 5 comprises a mechanism for applying an initial pressure to the mass of plastic material being fed to the extrusion outlet to initiate its flow through the feed cavity. A conventional drive mechanism associated with the worm screw 5 is operated at constant speed with a conventional drive and transmission mechanism so as to maintain a continuous flow of plastic material into the cavity. Through the reciprocable plunger 10, which effects the size of the feed cavity, means are provided for selectively varying the capacity of this cavity. The reciprocable nature of the tip 25 enables the inner surface of the extrusion outlet to be varied in position.

With the extrusion screw 5 continuously operating, movement of the plunger 10 is effective to change the rate at which plastic material reaches the extrusion outlet and the pressure at which material is extruded through the outlet to form a hollow parison. When the plunger 10 is raised and moved out of the feed cavity, the cavity is enlarged so as to diminish the rate at which plastic material reaches and passes through the extrusion outlet and reduce the pressure at which it is extruded between the tip 25 and the ring 26. When the cavity is enlarged by upward movement of the plunger 10, the resulting reduction in extrusion pressure effects a diminishing of parison outside diameter and wall thickness. Downward movement of the tip 25 restricts the flow of plastic material through the extrusion outlet and causes an increase in parison inside diameter and parison wall thinning. Thus, downward movement of tip 25 coordinated with upward movement of plunger 10 produces an intensified or augmented parison thinning.

The size of the cavity supplying plastic material to an extrusion outlet and the size of the outlet in the FIGURE 1 apparatus may be selectively varied, in precisely determined relation to an over-all extrusion operation, so as to enable the obtaining of highly controlled, localized parison thinning.

By withdrawing the plunger 10 rapidly from the passage 8, an immediate reduction in extrusion pressure is obtained without affecting the operation of the main feed device, which reduction will produce an abrupt necking-in of the parison as shown at the parison portion X illustrated in FIGURE 2. Thus, where a parison is being extruded having a cross-section as shown in FIGURE 4, the plunger withdrawal is effective to produce a reduction in parison outside diameter and a consequent wall thinning so as to produce a cross-section as shown in FIGURE 5. This localized parison wall thinning may be augmented and accentuated by a downward movement of the tip 25 which will effect a simultaneous increase in parison inside diameter.

The upward plunger movement will slow the rate at which material is extruded through the extrusion outlet, in relation to prior and subsequently extruded parison portions. This extrusion delay may produce an intensified degree of heating of the plastic material being extruded. Such intensified heating could result from a heating element associated with the extrusion ring to maintain the plasticity of extruding material. This element could assume the form of a resistance type electrical unit 26(b) embedded in and encircling ring 26, as illustrated in FIGURE 1, or a stream or other hot fluid conveying jacket encircling the ring 26. The localized heating produced by such a heating unit would reduce the viscosity of the parison at its thinned portion so as to further facilitate a severing or tearing action.

Conventional, separable mold halves 38 and 39 may be closed about the parison portion extruded prior to the portion X and then moved downwardly as shown in FIGURE 3. This downward mold movement imposes an axial force on the parison which is effective to separate the prior extruded parison portion. This technique has been found to be particularly advantageous where large diametered parisons are being extruded. With such large diametered parisons, conventional knife cutting techniques have proven to be tedious and frequently ineffective. Tearing without thining would produce parison fouling so as to impede the over-all operation.

Due to the somewhat elastic nature of the plastic material being extruded, the axial pull exerted by the closed molds 38 and 39 may tend to cause a snap-back action in the plastic material remaining above the thinned portion X after the parison severing has taken place. This snap-back action could result in plastic material engaging the surface of the ring 26 and adhering to it so as to impede further extrusion operations. To avoid this phenomena, extrusion may be continued for a limited time after the portion X has been thinned. In this manner, any snap-back action which might take place will not be effective to cause the free severed end shown in FIGURE 3 to engage the under surface of the ring 26.

To effect the parison severing operation previously described, it is necessary to move the plunger 10 to a withdrawn or upper position. While it is desirable to restore the plunger to its initial position, this restoration may well result in some parison wall thickening. However, where articles such as containers are being formed, this restoration may be advantageously employed to thicken, and thus strengthen, a lower article portion. As shown in FIGURE 2, the lower portion of the extruded parison which is to be severed has been thickened so as to produce an enlarged cross-section as shown in FIGURE 6. This thickening was accomplished by a downward movement of the plunger 10 to restore it to its initial position subsequent to a previous severing operation. As shown in FIGURE 3, a thickening in the lower portion of a following parison has been effected by lowering the plunger to its initial position after thinning the portion X shown in FIGURE 2. This restoration of the plunger 10 may be accomplished either before or after the severing of the parison beneath the portion X. If it is effected before the severing of the parison by downward movement of the closed mold sections 38 and 39, an enhanced line of demarcation will be established above the thinned portion X which may serve to facilitate the severing operation. Such thickening may also be desirable to offset parison distortion tendencies resulting from the imposed tearing force.

Several advantages may be attributed to the present invention. Foremost among them is the precision, highly controllable, and non-fouling nature of the parison severing operation.

The technique described for effecting parison thinning so as to enable controlled parison severing eliminates the necessity for employing a conventional parison severing blade or knife. Thus, the problems attendant upon such a severing structure are entirely avoided.

A further advantage of the invention involves the restoring of the parison thinning mechanism so as to effect a desired parison thickening subsequent to a thinning produced for severing purposes. By consecutively withdrawing the disclosed plunger to effect a parison thinning and then restoring the plunger to cause a thickening in the lower end of a succeeding parison, the plunger is disposed to effect whatever parison changes may be necessary in intermediate parison portions.

While the technique of this invention has been described with reference to preferred embodiments, modifications may readily occur to those skilled in the extruding arts. For example, although a preferred technique for severing a parison below a thinned section involves the imposition of an axial and outwardly directed force, it is possible, in certain instances, that severing may be effected by a force imposed laterally against a parison or by an upwardly directed force imposed above the thinned parison portion.

It is also within the purview of the invention to provide an extrusion apparatus other than that herein disclosed in order to accomplish the controlled and well defined thinning of a preselected parison portion for parison thinning purposes.

Other modifications may occur to practitioners in the extrusion art which would be well within the scope of the invention as defined in the appended claims.

I claim:
1. A method of severing a tubular formation of plastic material being extruded through an extrusion outlet, said method comprising:
   applying an initial pressure to a mass of plastic material to initiate its flow through a cavity communicating with an extrusion outlet;
   selectively reducing the pressure at which material is extruded through said outlet so as to reduce the wall thickness of a selected portion of an extruding formation whereby a prior extruded portion of said formation may be disengaged by tearing; and
   exerting a force on said formation of plastic material so as to tear the portion extruded prior to said pressure reduction from the portion extruded subsequent thereto.

2. A method as recited in claim 1 wherein said plastic material is heated as it passes through said extrusion outlet, and wherein the pressure at which material is extruded through said outlet is abruptly reduced by rapidly enlarging said cavity in close proximity to said extrusion outlet.

3. A method of severing a tubular formation of plastic material being extruded through an extrusion outlet, said method comprising:
   applying an initial pressure to a mass of plastic material to initiate its flow through a cavity communicating with an extrusion outlet;
   maintaining said cavity open to provide continuous communication between said mass of material and said outlet;
   continuously maintaining an application of initial pressure to maintain a continuous flow of said material entering said cavity;
   selectively enlarging the capacity of said cavity at such a rapid rate as to selectively and abruptly reduce the external dimension and wall thickness of a selected portion of an extruding formation whereby a prior extruded portion of said formation may be disengaged by tearing; and
   exerting a force on said formation of plastic material so as to tear the portion extruded prior to said cavity enlargement from the portion extruded subsequent thereto.

4. A method as recited in claim 3 wherein plastic material extrusion is continued after the enlarging of the capacity of said cavity and thereafter said axial force is exerted on said prior extruded parison portion.

5. A method as recited in claim 4 wherein said cavity is selectively enlarged in close proximity to said annular extrusion outlet.

6. A method as recited in claim 3 wherein said cavity is enlarged by withdrawing a plunger therefrom.

7. A method as recited in claim 6 wherein, after said cavity enlargement, the capacity of said cavity is reduced by moving said plunger thereinto so as to selectively enlarge the external dimension of a selected portion of said extruding formation.

References Cited by the Examiner

UNITED STATES PATENTS

| | | | |
|---|---|---|---|
| 2,356,886 | 8/1944 | Reis | 264—167 |
| 2,455,509 | 12/1948 | Luaces | 264—167 |
| 2,928,120 | 3/1960 | Leghorn et al. | 264—98 |
| 3,078,507 | 2/1963 | Park | 264—98 |

ROBERT F. WHITE, *Primary Examiner.*

ALEXANDER H. BRODMERKEL, ALFRED L. LEAVITT, *Examiners.*

J. R. DUNCAN, A. R. NOE, *Assistant Examiners.*